Patented Oct. 18, 1949

2,485,167

UNITED STATES PATENT OFFICE 2,485,167

MANUFACTURE OF METAL-FREE PHTHALOCYANINE

William Llewlyn Rintelman, Glassboro, N. J., assignor to E. I. du Pont de Nemours & Company, Wilmington, Del., a corporation of Delaware No Drawing. Application April 1, 1948, Serial No. 18,491

3 Claims. (Cl. 260—314.5)

This invention relates to the production of metal-free phthalocyanines. More particularly, this invention deals with an improved catalytic process for making metal-free phthalocyanines directly from the corresponding phthalonitriles.

Metal-free phthalocyanine, which is the common name for what is strictly speaking dihydrogen-phthalocyanine, has heretofore been prepared by two principal methods. In the indirect method, a metal phthalocyanine is first formed and the metal is then replaced by hydrogen by special treatment. Thus, in Thorpe et al., U. S. P. 2,000,051, metal-free phthalocyanine was produced from ortho-cyanobenzamide by preparing first magnesium phthalocyanine and treating the latter with concentrated sulfuric acid. According to the same patent, if antimony is employed in the synthesis in lieu of magnesium, metal-free phthalocyanine results directly. In U. S. P. 2,000,052, the same pigments were prepared from magnesium and antimony, respectively, using phthalimide in lieu of o-cyanobenzamide.

In U. S. P. 2,202,632 issued to Heilbron et al., phthalonitrile is employed as initial material; but this is converted first into the phthalocyanine of calcium, barium, magnesium, cadmium or beryllium by reaction with the respective metal or an oxide or salt thereof, and the metal phthalocyanine is then converted into the metal-free compound by treatment with concentrated sulfuric acid.

In Dent's U. S. P. 2,214,454, a commercial process for manufacturing metal-free phthalocyanine is proposed wherein phthalonitrile is first converted into sodium- or potassium-phthalocyanine by reaction with the respective metal in boiling amyl alcohol, according to U. S. P. 2,116,-602, and the pigment is then extracted with methyl alcohol and water, resulting in the metal-free compound.

In the second principal method, attempts have been made to prepare dihydrogen-phthalocyanine directly from phthalonitrile or other phthalocyanine-yielding intermediates, by the aid of catalysts. The first attempt along these lines I find in Heilbron et al., U. S. P. 2,116,602, wherein the reaction was carried out in quinoline or dimethylaniline as a solvent, and ammonia was employed as catalyst.

An attempt was also indicated there at converting molten phthalonitrile into pigment in the absence of a solvent, but using ammonia as catalyst.

A second attempt wherein no solvent was employed, was indicated in Lowe's U. S. P. 2,155,054. Here, the phthalonitrile was fused, and mono-, di- or triethanol amine was employed as catalyst. Still a different solvent-free procedure was described by Palmer and Gross U. S. P. 2,413,191, wherein the initial material was ground dry in the presence of an alkali-metal or alkaline-earth hydroxide, using methylglucamine as catalyst.

All the above procedures nevertheless suffer from poor yields, poor quality of the product, or else too many manipulative steps which render the process costly on a large scale.

Accordingly, it is an object of this invention to provide an improved process for producing metal-free phthalocyanine by a direct method and using inert organic solvents. A further object is to provide a process for the commercial production of metal-free phthalocyanine in good yield and high quality. A still further object is to produce metal-free phthalocyanine by a process which results in a crystalline product contained in an organic liquid, whereby recovery may be effected directly by the simple process of filtration. Other and further important objects of this invention will appear as the description proceeds.

Now, in accordance with my invention, these objects are realized by carrying out the synthesis from standard material, to wit phthalonitrile or a substitution derivative thereof, using an inert organic solvent, for instance trichloro benzene, and using as catalyst a limited quantity of an organic nitrogenous base whose dissociation constant falls within definite limits, as more fully set forth hereinbelow.

I find that primary and secondary amines (including in the latter category heterocyclic secondary bases, such as piperdine, pyrrolidine and morpholine) form excellent catalysts for the reaction in question, provided that their dissociation constant K falls within the limits $2 \times 10^{-4}$ to $2 \times 10^{-3}$, and provided further that their quantity is limited to not over 20% by weight of the o-arylene dicyanide employed.

The first condition may be rationalized by considering that the dissociation constant of a given base constitutes no doubt an important factor in determining its reactivity as a base. The second condition does not lend itself readily to logical explanation, and must be considered as an empirical law determined by the observed facts.

The effectiveness of any given base or any given quantity thereof as a catalyst for the purpose of this invention may best be gaged by the yield of metal-free phthalocyanine obtained by its aid from phthalonitrile. By the aid of this gage, using ortho-dichlorobenzene as solvent (except where otherwise explicitly specified) and maintaining otherwise uniform reaction conditions, I have found the bases indicated below to behave as follows:

| Base | Dissociation Constant "K" | Wt. of Base per 100 parts of phthalonitrile | Per Cent Yield | Remarks |
|---|---|---|---|---|
| Di-n-propylamine | $1.02 \times 10^{-3}$ | 7.5 | 60 | |
| Do | $1.02 \times 10^{-3}$ | 10 | 68 | |
| Do | $1.02 \times 10^{-3}$ | 250 | None | In absence of other solvents. |
| Di-ethylamine | $1.26 \times 10^{-3}$ | 9.0 | 72 | |
| Piperidine | $1.6 \times 10^{-3}$ | 8.6 | 78 | |
| Alpha-pipecoline | $9.6 \times 10^{-4}$ | 8.6 | 78 | |
| Nitrogen bases (mixture of pyrrolidine, piperidine, alpha pipecoline and others). | ($1.5 \times 10^{-3}$, etc.) | 15–20 | 78 | |
| Cyclohexylamine | $4.39 \times 10^{-4}$ | 10 | 78 | |
| Do | $4.39 \times 10^{-4}$ | 300 | None | Do. |
| Mono-sec. hexylamine | $4.4 \times 10^{-4}$ | 17.5 | 72 | |
| Isoamylamine | $5 \times 10^{-4}$ | 9 | 70.2 | |
| Lorolamine | $4.3 \times 10^{-4}$ | 10 | 72 | |
| Morpholine | $2 \times 10^{-6}$ | 12.5 | 65.5 | |
| Do | $2 \times 10^{-6}$ | 25 | 50 | |
| Triethanolamine | $5.92 \times 10^{-7}$ | 10 | 50 | |
| Pyridine | $2 \times 10^{-9}$ | 10 | Trace | |
| Quinoline | $1 \times 10^{-9}$ | 12.5 | 16.2 | Impure product. |
| Urea | $1.5 \times 10^{-14}$ | 10 | None | |

Taking the yield of 68% as the lower limit of commercial practicability under competitive conditions, it will be observed that the applicable bases all have a K-value not less than $2 \times 10^{-4}$ and not greater than $2 \times 10^{-3}$, and that the optimum quantities lie between 8 and 20 parts by weight of the base per 100 parts by weight of phthalonitrile. It is particularly remarkable that when certain otherwise satisfactory secondary amines were employed in sufficient quantity to replace the solvent or liquid vehicle for the reaction, the reaction took a different course, and no dyestuff was formed. In the case of another secondary amine (morpholine), doubling the amount of base, while still employing ortho-dichlorobenzene as solvent, caused the yield to drop below the acceptable practical minimum.

Apart from the above limitation as to the nature of the catalyst and its quantity, the reaction in my improved process may follow standard practice. For instance, the quantity of solvent may be any convenient quantity sufficient to dissolve the initial phthalonitrile. The temperature of reaction may vary anywhere from 185° to 230° C., with an optimum probably at about 200° to 210° C. The factor to consider here is that lower temperatures favor a purer final product but slow down the reaction. The higher temperatures speed up the reaction, but often contaminate the product with undesirable decomposition products.

In lieu of trichlorobenzene or dichlorobenzene, other inert organic solvents may be employed, for instance benzene, toluene, solvent naphtha, acetonitrile, cyclohexanol or molten naphthalene; and where the boiling point of the solvent selected is lower than the desired reaction temperature, the reaction may be carried out under autogenous pressure in a closed vessel.

The process may be applied to phthalonitrile itself, to produce metal-free phthalocyanine; or it may be applied to substitution derivatives of phthalonitrile to produce correspondingly substituted metal-free phthalocyanines. As instances of such substituted phthalonitriles may be mentioned: 3- or 4-chloro-phthalonitrile, 4,5-dichloro-phthalonitrile, 3- or 4-nitro-phthalonitrile, the cyano-phthalonitriles, the mercapto-phthalonitriles, the methyl - phthalonitriles, phenyl-phthalonitriles, etc.

The recovery of the dyestuff in my improved process may be effected by filtering off or steam distilling off the solvent, which simultaneously carries off with it the catalyst and any residual phthalonitrile. In general, the recovery may follow any of the procedures employed in this connection in the art heretofore.

Without limiting my invention, the following example is given to illustrate my preferred mode of operation. Parts mentioned are by weight.

Example 1

100 parts of phthalonitrile are entered into 250 parts of trichlorbenzene and heated to 130°–150° C. to drive off traces of moisture. 8.5 parts of cyclohexylamine are then added and the solution is further heated under agitation to 210° C. The reaction mass at first turns yellowish brown, then green, after which crystals of metal-free phthalocyanine begin to form. The mixture is held at temperatures between 200 and 210° C. for a period of 12 to 14 hours to complete the reaction. It is then allowed to cool and is filtered with suction at 125°–180° C. The reddish violet crystalline press cake is washed with trichlorbenzene until the wash liquor is colorless, and is then dried at 100°–125° C. under vacuum or in an air oven to remove the last traces of solvent.

The washed press cake may also be freed of solvent by other means, such as steam distillation followed by filtration and drying or by washing with a volatile solvent such as benzene or carbon tetrachloride. In the latter case the filter cake may be sucked dry on the crock and weighed immediately.

Metal-free phthalocyanine is thus obtained in very pure form as a reddish violet, highly crystalline product. Under the microscope the crystals appear as heavy dense greenish blue needles. The yield is 77–78 parts, which is equivalent to 77–78% of the theoretical amount. Without further purification, it may be converted to the finely divided form necessary for pigment use, by grinding with salt and removing the salt by extraction with water (U. S. P. 2,402,167), or by dissolving in strong sulfuric acid and precipitating by drowning in water and filtering. Pigments of exceptional strength and brilliance are obtained.

Instead of trichlorbenzene, dichlorobenzene, cyclohexanol or any other of the solvents hereinabove named may be employed.

Example 2

100 parts of phthalonitrile and 8.5 parts of piperidine are entered into 300 parts of o-dichlorbenzene, and heated for 12 to 14 hours at a temperature of 200°–210° C. under autogenous pressure. The reaction mass is cooled to 100°–125° C., filtered, and given several washes with fresh dichlorbenzene, and dried. The washed press cake may also be freed of solvent by other means, as set forth in Example 1. Likewise, the solvent specified may be replaced by any of those enumerated in Example 1. The yield and quality of the product are substantially the same as in Example 1.

If the 8.5 parts of piperidine above are replaced by an equal weight of alpha-pipecoline, equally good results are obtained.

*Example 3*

100 parts of phthalonitrile and 20 parts of "Reduced Nitrogen Bases" (a commercial product of Standard Oil Company of California, and probably consisting of a mixture of hydrogenated pyridines, picolines, etc.) are entered into 300 parts of trichlorobenzene, and heated at 210°–212° C. under a reflux condenser for 12 to 16 hours. The product is isolated by filtration as in Example 1 and is identical in high-qualities with that obtained in Example 1. The yield is about 78%.

It will be understood that the details of procedure may be varied within wide limits, without departing from the spirit of this invention. For instance, other assistants, diluents or catalysts may be added to the reaction mass if desired. I find, for instance, that small amounts of hydroxy compounds, such as ethylene glycol may be added to the reaction mass in conjunction with traces of alkali carbonates (e. g. potassium carbonate), and that such addition under certain circumstances lowers the reaction temperature, or accelerates the reaction at any specified temperature. Further details on this modification of the process are set forth in my copending application Serial No. 18,492, of even date herewith, now U. S. Patent 2,485,168.

The metal-free phthalocyanine obtained by this invention may be used for the preparation of high quality pigment pastes and powders, for use in printing inks, in textile drying, in paper coloring, etc.

My invention furnishes a more economical process of preparing a very pure product in higher yields than heretofore realized. It also has the advantage of giving material having a much greener and brighter shade than that previously obtained.

I claim as my invention:

1. A process for the manufacture of a metal-free phthalocyanine, which comprises heating an orthoarylene dicyanide of the benzene series in an inert organic solvent and in the presence of an organic nitrogenous base selected from the group consisting of cyclohexylamine, piperidine, and alpha-pipecoline, said base being employed in quantity not exceeding 20 parts by weight of the base per 100 parts by weight of said orthoarylene dicyanide.

2. A process for the manufacture of a metal-free phthalocyanine which comprises heating an orthoarylene dicyanide of the benzene series at a temperature between 185° and 230° C. in an inert organic solvent, in the presence of a quantity of cyclohexylamine not exceeding 20% by weight of the initial orthoarylene dicyanide.

3. The process of preparing metal-free phthalocyanine which comprises heating phthalonitrile in trichlorobenzene, at a temperature between 185° and 230° C., and in the presence of a quantity of cyclohexylamine not exceeding 20% by weight of the initial quantity of phthalonitrile.

WILLIAM LLEWLYN RINTELMAN.

REFERENCES CITED

The following references are of record in the file of this patent:

UNITED STATES PATENTS

| Number | Name | Date |
|---|---|---|
| 2,155,054 | Lowe | Apr. 18, 1939 |